United States Patent
Carremm et al.

(10) Patent No.: US 10,569,692 B1
(45) Date of Patent: Feb. 25, 2020

(54) CARGO SUPPORT SYSTEM

(71) Applicant: FORD GLOBAL TECHNOLOGIES, LLC, Dearborn, MI (US)

(72) Inventors: Swadad A. Carremm, Canton, MI (US); Mahmoud Yousef Ghannam, Canton, MI (US); Ronald David Kurth, Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 70 days.

(21) Appl. No.: 16/108,809

(22) Filed: Aug. 22, 2018

(51) Int. Cl.
*B60P 7/08* (2006.01)
*B60P 7/15* (2006.01)

(52) U.S. Cl.
CPC ............... *B60P 7/0815* (2013.01); *B60P 7/15* (2013.01)

(58) Field of Classification Search
CPC ........... B62D 33/08; B60P 7/0807; B60P 7/15
USPC ..................................................... 296/3, 26.4
See application file for complete search history.

(56) References Cited

U.S. PATENT DOCUMENTS

| | | | |
|---|---|---|---|
| 3,460,864 A * | 8/1969 | Piercy | B60R 9/00 296/3 |
| 4,343,578 A | 8/1982 | Barnes | |
| 5,037,152 A * | 8/1991 | Hendricks | B60R 9/00 296/26.06 |
| 5,961,171 A | 10/1999 | Iijima | |
| 6,196,602 B1 * | 3/2001 | Esplin | B60P 7/08 224/405 |
| 6,332,637 B1 * | 12/2001 | Chambers | B62D 33/08 296/26.04 |
| 7,497,493 B1 | 3/2009 | Thiessen et al. | |
| 7,740,430 B2 | 6/2010 | Mchugh et al. | |
| 7,746,379 B2 * | 6/2010 | Jesson | G06Q 10/087 348/161 |
| 9,937,848 B1 * | 4/2018 | Grabowski | B60P 7/15 |
| 2007/0110539 A1 | 5/2007 | Klinkman et al. | |

FOREIGN PATENT DOCUMENTS

| | | | |
|---|---|---|---|
| JP | 2006001292 A | 1/2006 | |
| WO | 2014133436 A1 | 9/2014 | |
| WO | WO-2017196226 A1 * | 11/2017 | ............ B60W 50/14 |

OTHER PUBLICATIONS https://www.etrailer.com, Yakima BedRock Truck Bed Cargo Rack—Full.
m/Roof-Rack/Yakima/Y01140-78.html, Size Trucks.
https://www.amazon.com/Adjustable-Ratcheting-Pickup-Truck-Cargo/dp/B004JL0QZA, Adjustable Ratcheting Pickup Truck Bed Cargo Bar.

* cited by examiner

*Primary Examiner* — Pinel E Romain
(74) *Attorney, Agent, or Firm* — Vichit Chea; MacMillan, Sobanski & Todd, LLC (57) ABSTRACT

A cargo support system including a truck bed having longitudinal extending sidewalls, longitudinally extending rails mounted above the sidewalls, each having a longitudinal slot on an underside connected to a longitudinal channel, and arms suspended from the underside of the rails above the sidewalls, each pivotable between a longitudinal orientation under the respective rail and a lateral orientation extending over the bed.

19 Claims, 7 Drawing Sheets

CARGO SUPPORT SYSTEM

BACKGROUND OF THE INVENTION

The present invention relates to a cargo support system for a vehicle, and may more specifically apply to a pickup truck type of vehicle.

Trucks are typically configured for ease in loading, unloading and hauling cargo. For example, pickup truck beds may have features that allow for ease of loading and unloading cargo, as well as supporting and securing the cargo while traveling. Some have attempted to make supporting and securing cargo better by adding racks or other support assemblies. However, many of these types of assemblies require the addition of fittings, connectors, railings, drilling into structure, fasteners, locking latches, etc., which may be complicated to install and use. Such assemblies may also be difficult to customize/rearrange to accommodate different sizes and shapes of cargo that one may wish to transport, while also failing to maximize the carrying capacity of the truck cargo area. In addition, when the assemblies are not needed for transporting particular cargo, they may be time consuming and difficult to remove or move out of the way.

SUMMARY OF THE INVENTION

An embodiment contemplates a cargo support system that may include a truck bed having longitudinal extending sidewalls, longitudinally extending rails mounted above the sidewalls, each having a longitudinal slot on an underside connected to a longitudinal channel, and arms suspended from the underside of the rails above the sidewalls, each pivotable between a longitudinal orientation under the respective rail and a lateral orientation extending over the bed.

An advantage of an embodiment is that a cargo support system is light weight and easy to install/remove, as desired. Additionally, such a system is easily adjustable to support and secure cargo in a truck for transport. Such a system may also enhance the hauling capacity of the truck. The cargo support system may also be employed with the cargo areas for various types of trucks.

Another advantage of an embodiment is that the cargo support system may monitor cargo load stability while transporting the cargo and provide a notice relative to the stability, when needed.

DETAILED DESCRIPTION

FIGS. 1-13 illustrate a truck 20, which may be a pickup truck, having a cab 22 and a bed 24, with the bed 24 having longitudinally extending sidewalls 26, a floor 28, a laterally extending front wall 30 and a laterally extending tailgate 32. A cargo support system 34 is mounted to the top 36 of the sidewalls 26.

The cargo support system 34 includes four mounts 38 (one shown in detail in FIG. 4) secured to the tops 36 of the sidewalls 26, a pair of mounts 38 on each of the right sidewall 26 and the left sidewall 26. The mounts are shaped to receive and secure end portions of a pair of longitudinally extending support rails 40 (shown in detail in FIG. 3).

Each support rail 40 includes a longitudinally extending portion 42 that extends along most of the length of the respective sidewall 26, and a vertically extending mount portion 44 that extends from the longitudinal portions 42 down into the respective mounts 38. Thus, the support rails 40 extend longitudinally, above (vertically spaced from) the tops 36 of the sidewalls 26. The longitudinal portions 42 of each support rail 40 includes an interior channel 46 with a slot 48 on the underside of each of the support rails 40 (best seen in FIGS. 6 and 11-13). These channels 46 are used to support movable arms 50 that are located vertically between (vertically spaced from) the support rails 40 and the tops 36 of the sidewalls 26.

These support rails 40 and arms 50 may be made of relatively light weight yet strong materials, such as for example aluminum—although other materials may be used instead if so desired. Also, while these components are illustrated with generally rectangular cross sections, other shaped cross sections may be employed instead, if so desired.

Figure 1:
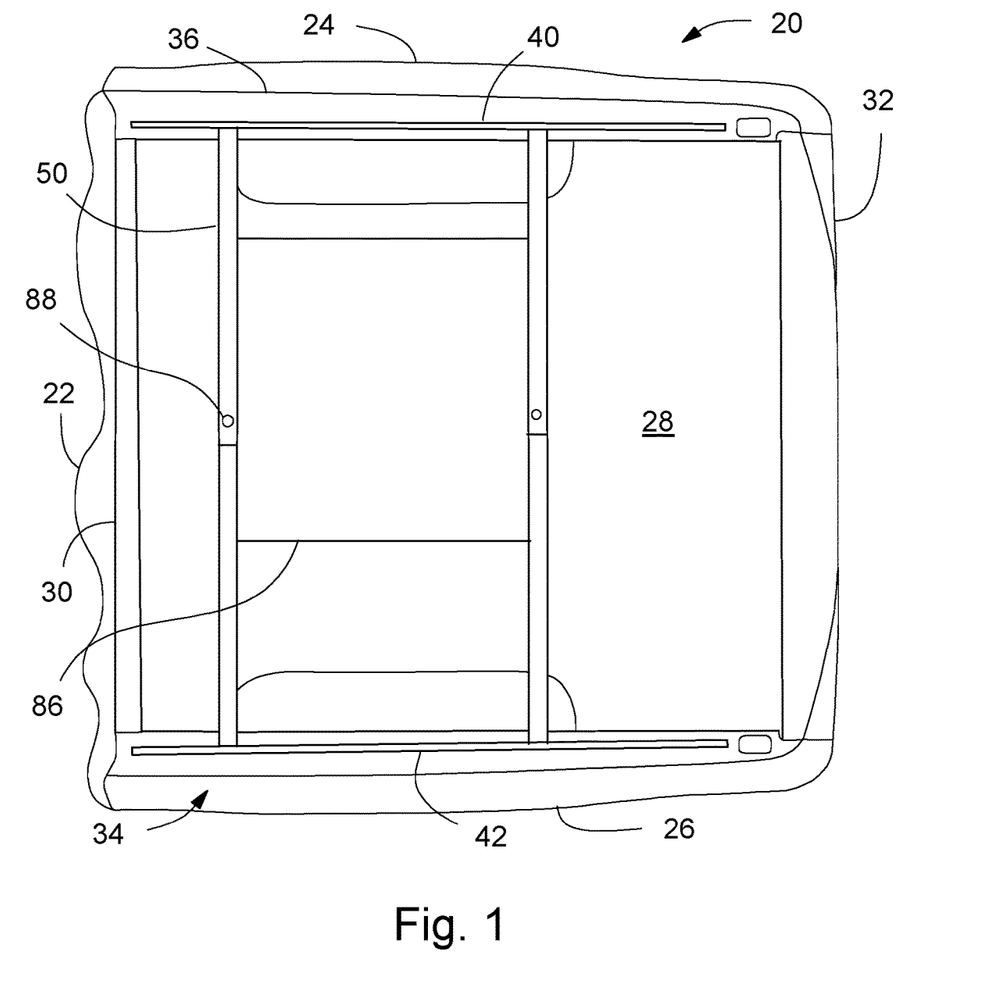
FIG. 1 is a schematic plan view looking down on a rear portion of a pickup truck with a cargo support system in an operating position supporting cargo.
Figure 2:
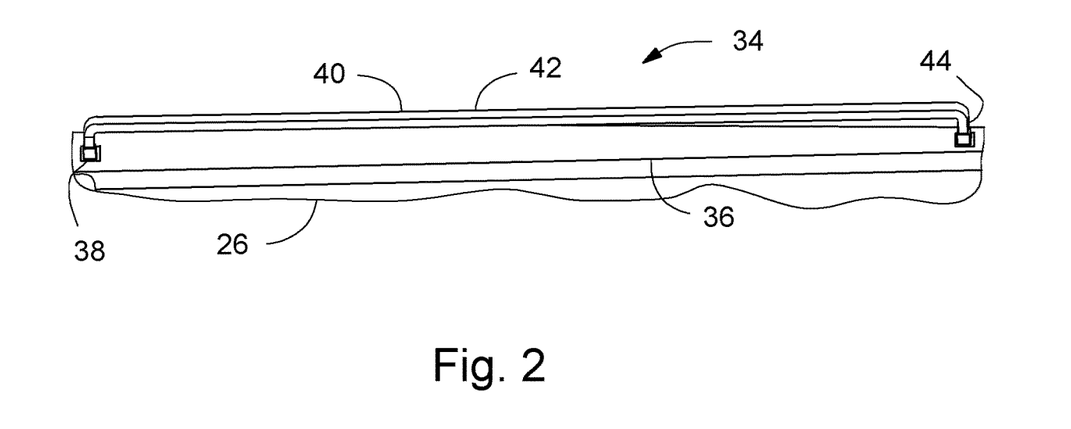
FIG. 2 is a schematic perspective view of a portion of a pickup truck right sidewall and a support rail for the cargo support system, without the arms shown.
Figure 3:
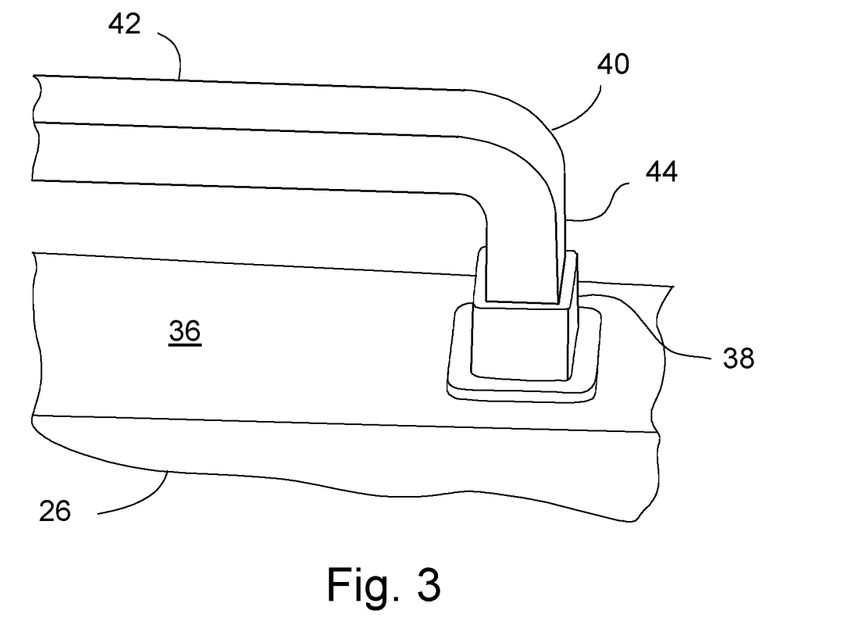
FIG. 3 is a schematic perspective view of a rear end of a support rail, on the truck right sidewall, for the cargo support system, without the arms shown.
Figure 4:
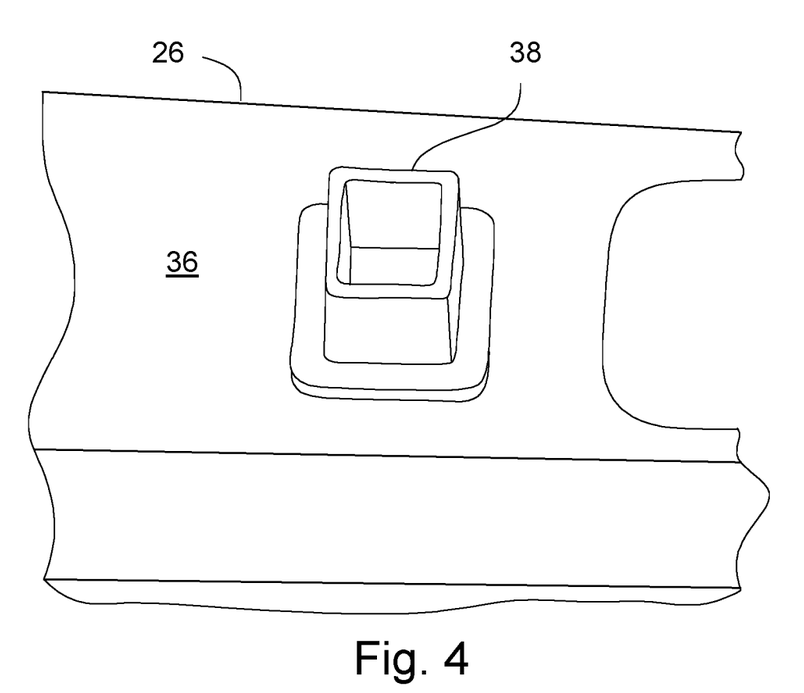
FIG. 4 is a schematic perspective view of a mount on a rear portion of the truck right sidewall, without the support rail or arms shown.
Figure 5:
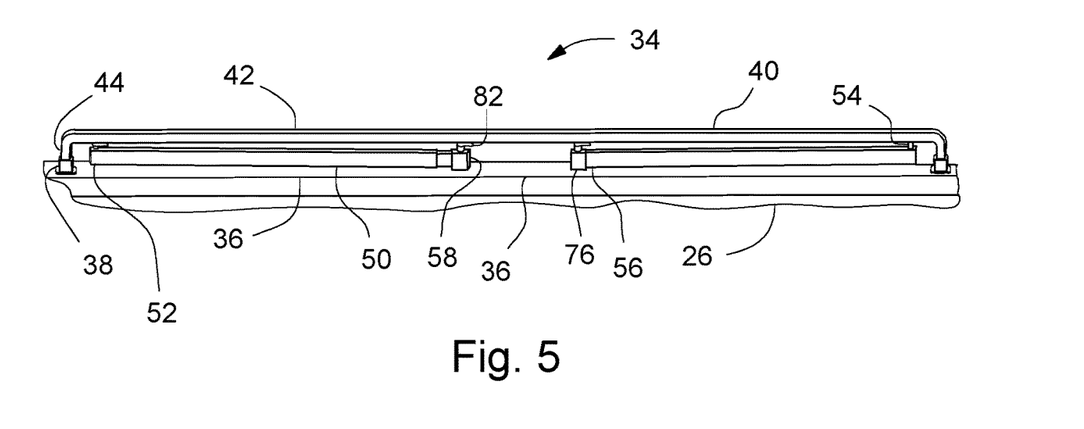
FIG. 5 is a schematic perspective view of a portion of a pickup truck right sidewall, support rail and arms in stowed positions.
Figure 6:
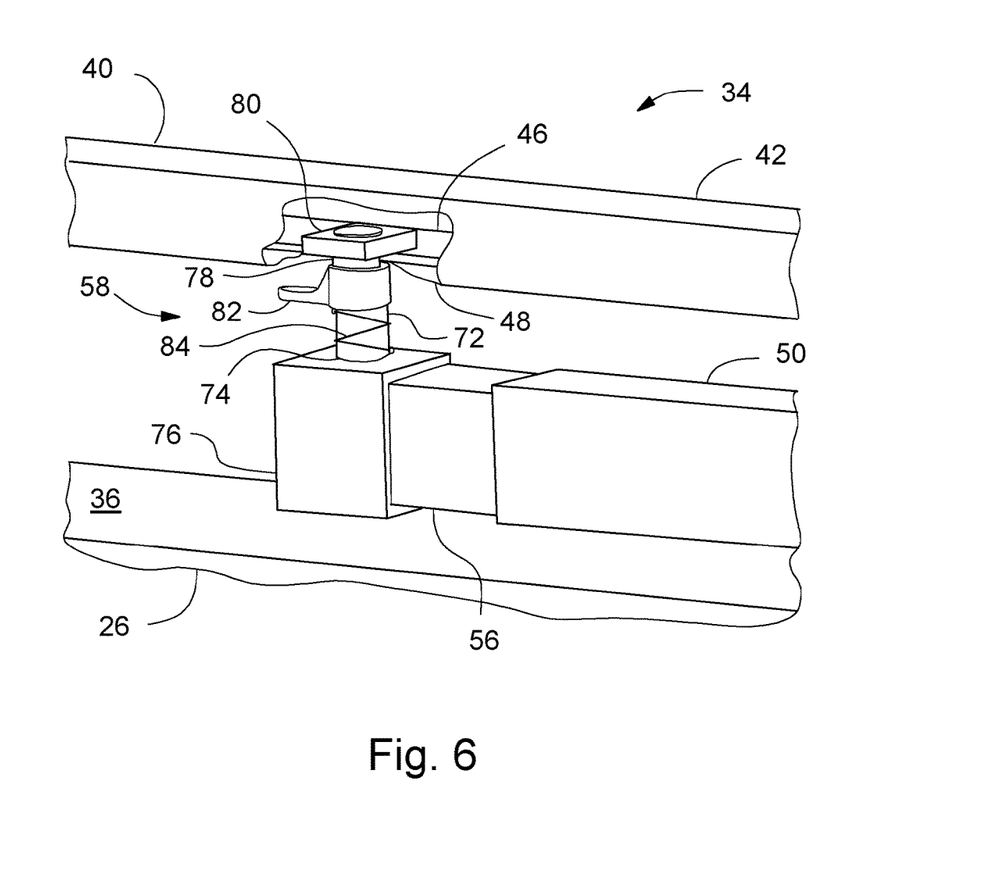
FIG. 6 is a schematic perspective, partial cutaway view of a portion of a support rail, arm and release latch in the stowed position.
Figure 10:
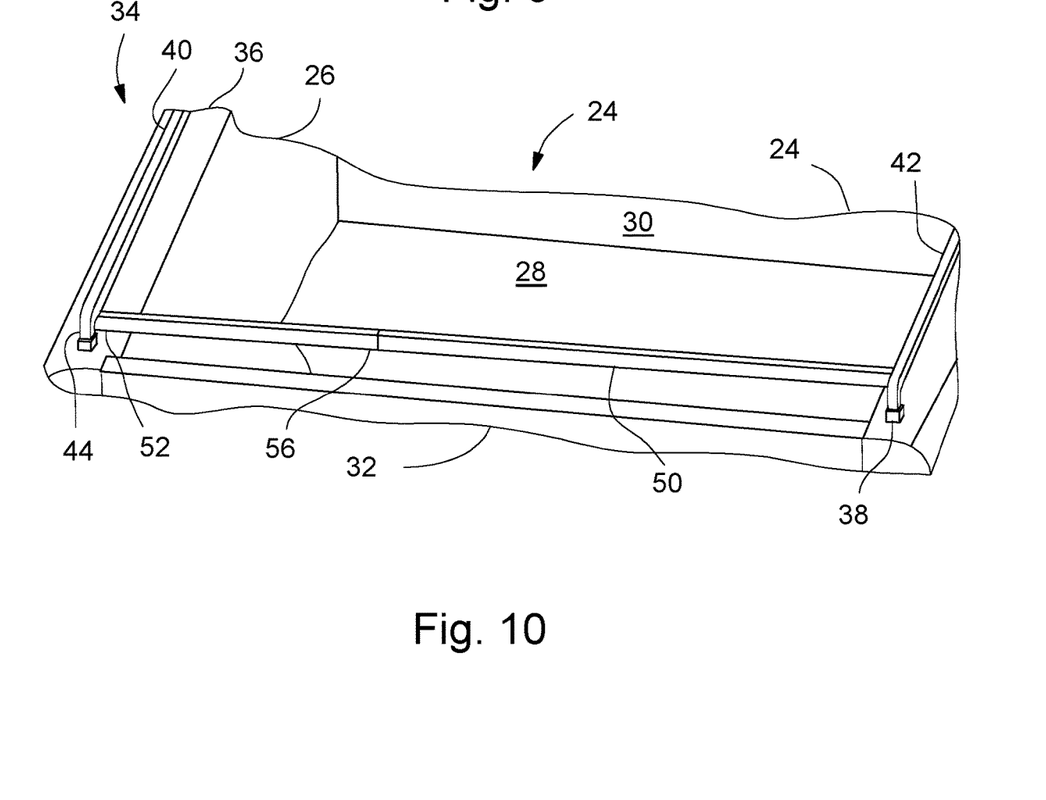
FIG. 10 is a schematic perspective view of the truck bed, portions of the support rails and rear arms extending laterally in the operating position, with the front arms not shown.
Figure 11:
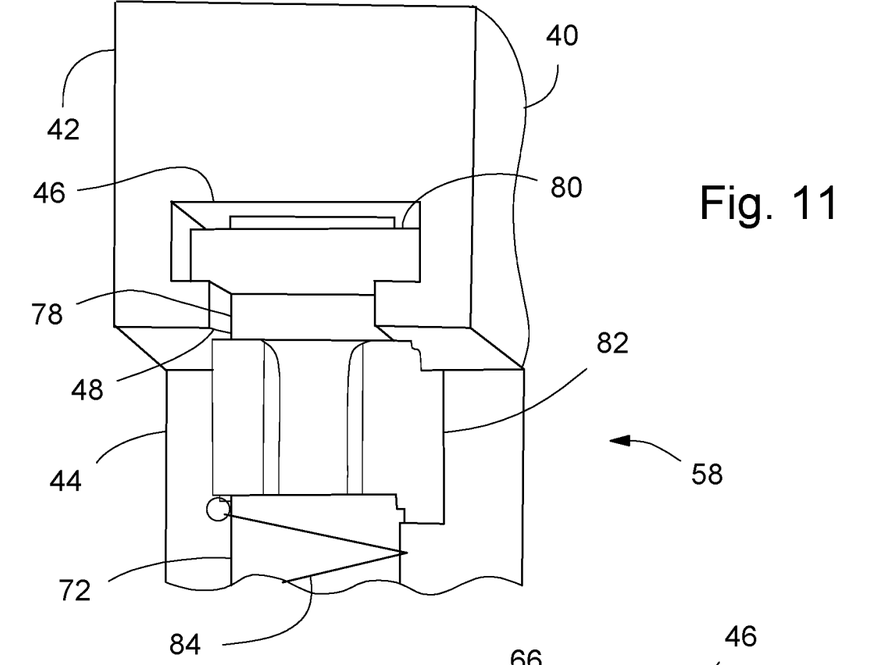
FIG. 11 is a schematic, partially cutaway view of a support rail and release latch.

The cargo support system 34 includes four of the arms 50, a front and a rear arm 50, above (vertically spaced from) each of the sidewalls 26. Each arm 50 is secured at a pivot end 52 by a pin assembly 54 (best seen in FIGS. 12 and 13), which maintains that end of each arm 50 adjacent to the respective support rail 40. The pivot end 52 for the front two arms 50 is at the front of each arm 50, while the pivot end 52 for the rear two arms is at the rear of each arm 50. Each arm 50 is also releasably secured at a connecting end 56 to a release latch 58 (best seen in FIGS. 6 and 11), which allows that end of each arm 50 to either be supported adjacent to the respective support rail 40 (stowed position, as shown in FIGS. 5 and 6) or to be swung out away from its respective support rail 40 toward the center of the bed 24 (operating position, as shown in FIGS. 1 and 10).

Each pin assembly 54 may include a pin 60, having a lower end 62 affixed to the respective arm 50 and an upper end 64 slidably received through the respective slot 48 into the respective channel 46. Each pin assembly 54 may also include a head 66, affixed to the upper end 64, having a width larger than the width of the slot 48, and slidable longitudinally along the respective channel 46. Also included with each of the pin assemblies 54 may be a lock 68 slidable vertically on the respective pin 60, with a spring 70 (shown schematically in FIGS. 12 and 13) biasing each respective lock 68 upwards towards engagement with the underside of the respective support rail 40 and biasing each head 66 toward the bottom of the respective channel 46.

Figure 12:
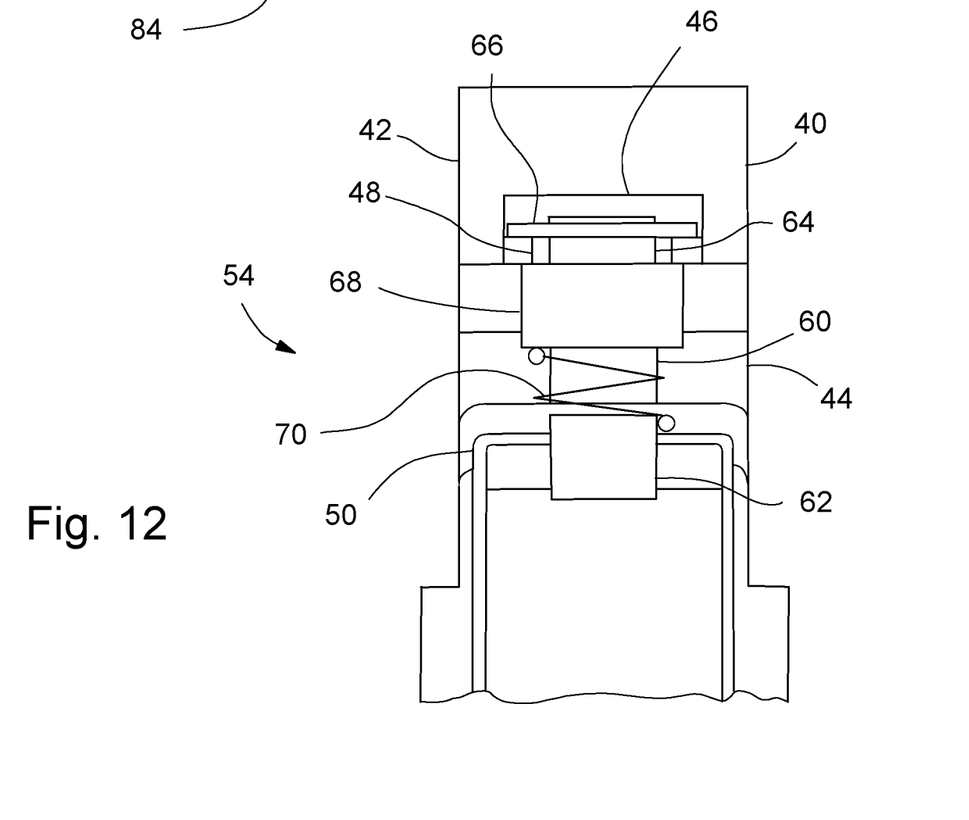
FIG. 12 is a schematic partially cutaway view of a support rail and pin assembly.
Figure 13:
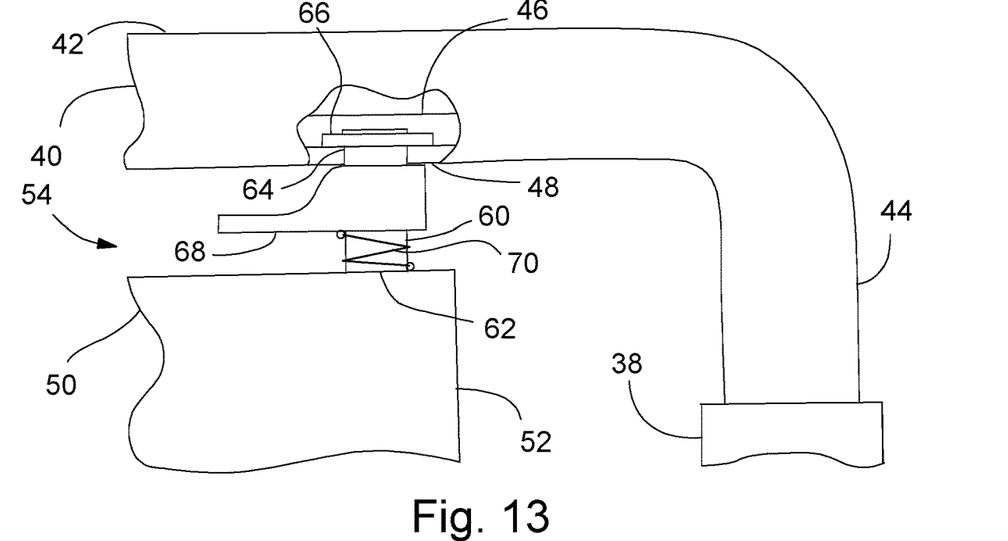
FIG. 13 is a schematic side view of a portion of a support rail, arm and pin assembly.

When the spring 70 biases the lock 68 and head 66 against the portions of the corresponding support rail 40, this locks the pin assembly 54 into position longitudinally along the support rail 40. When one wishes to move the pin assembly 54, one may push down on the lock 68 against the bias of the spring 70, slide the pin assembly 54 longitudinally along the channel 46 to a desired position, and then release the lock 68.

Each release latch 58 may include a pin 72, having a lower end 74 affixed to a respective end cap 76 and an upper end 78 slidably received through the respective slot 48 into the respective channel 46. Each release latch 58 may also include a head 80, affixed to the upper end 78, having a width larger than the width of the slot 48, and slidable longitudinally along the respective channel 46. Also included with each of the release latches 58 may be a lock 82 slidable vertically on the respective pin 72, with a spring 84 (shown schematically in FIGS. 6 and 11) biasing each respective lock 82 upwards towards engagement with the underside of the respective support rail 40 and biasing each head 80 toward the bottom of the respective channel 46.

Each end cap 76 may include an opening that allows the respective connecting end 56 of the corresponding arm 50 to slide in and out in order to selectively support that end 56 of the arm 50 when in the stowed position (best seen in FIG. 6). Thus, when the spring 84 biases the lock 82 and head 80 against the portions of the corresponding support rail 40, this locks the release latch 58 into position longitudinally along the support rail 40, holding the connecting end 56 in the respective end cap 76, thus holding the corresponding arm 50 in the longitudinal stowed position under the corresponding support rail 40.

When one wishes to deploy the arms 50 for support of cargo 86 (shown schematically in FIG. 1), one may push down on the lock 82 against the bias of the spring 84, slide the release latch 58 out of engagement with the connecting end 56 of the respective arm 50 and then release the lock 82. At this point, one is free to pivot the arm 50 about the corresponding pin assembly 54 from the longitudinally extending stowed position under the corresponding support rail 40 to a laterally extending operating position.

Figure 9:
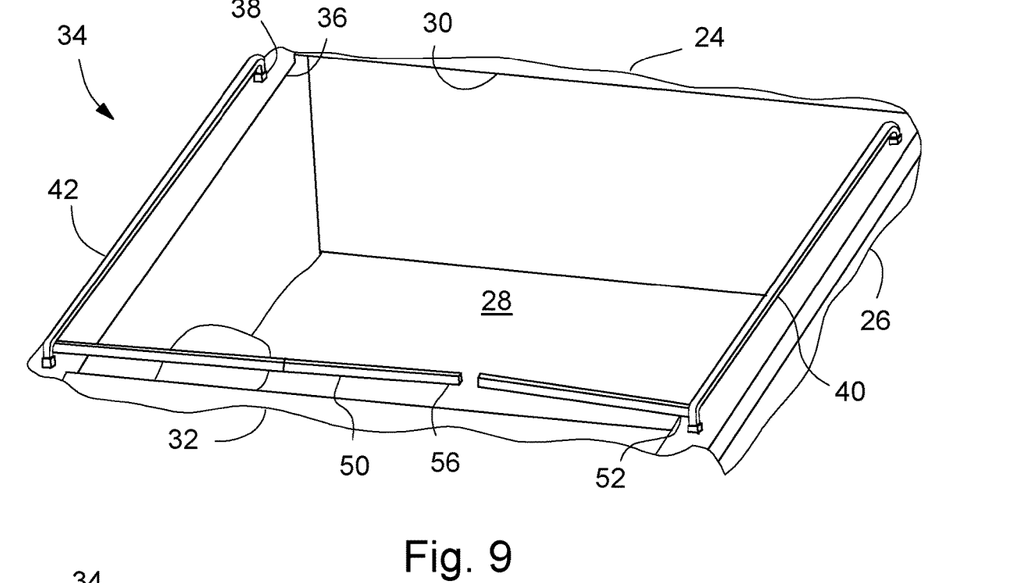
FIG. 9 is a schematic perspective view of the truck bed, support rails, and the rear arms extending laterally, almost in the operating position, with the front arms not shown.

As multiple arms 50 are pivoted toward the operating position (but not quite fully in the operating position, as illustrated with the rear arms 50 in FIG. 9), the connecting end 56 of one arm 50 can be aligned with the connecting end 56 of a corresponding arm 50. The corresponding arms 50 (front pair or rear pair) may be configured with one having a smaller cross section at its connecting end 56, allowing one to slide that smaller cross section end 56 of that arm 50 into the connecting end 56 of the corresponding arm 50, forming, in effect, a single arm assembly laterally spanning the bed 24 (best seen in FIGS. 1 and 10).

Figure 7:
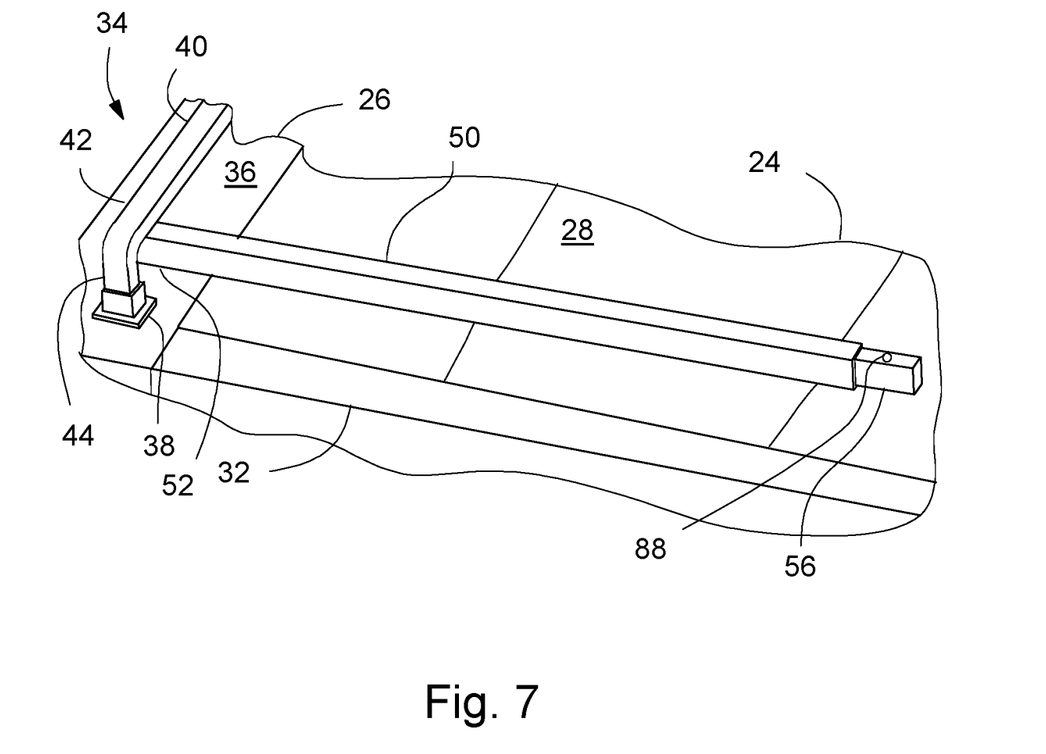
FIG. 7 is a schematic perspective view of a rear portion of a support rail on the truck left sidewall and one arm shown in an operating position in front of a tailgate.
Figure 8:
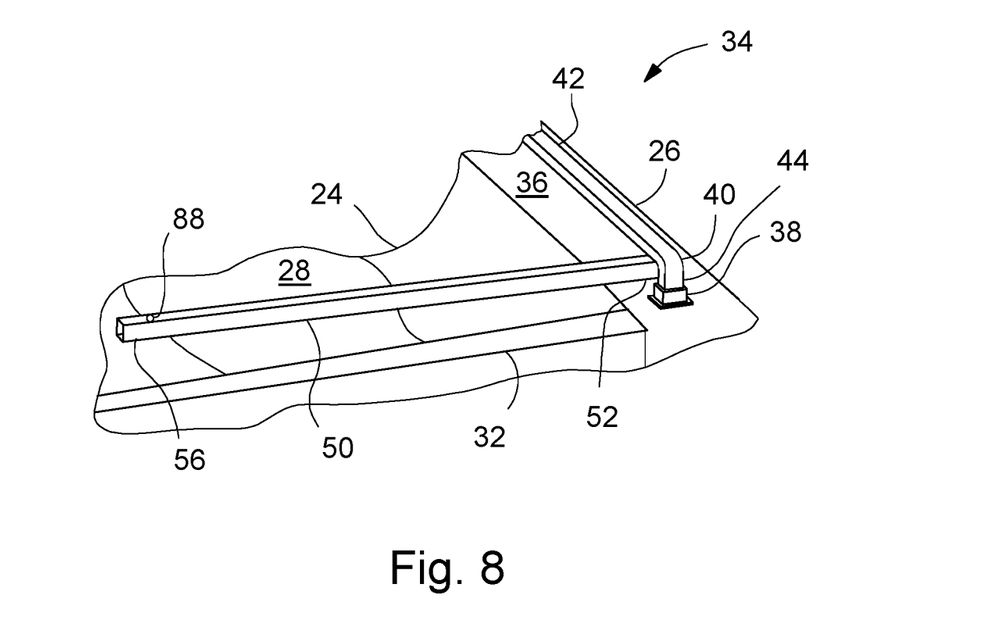
FIG. 8 is a schematic perspective view of a rear portion of a support rail on the truck right sidewall and one arm shown in an operating position in front of the tailgate.

The corresponding arms 50 may include some type of releasable securement mechanism to hold their connecting ends 56 together while securing the cargo 86—such as a spring-pin assembly 88 where a spring loaded pin in one arm 50 near the connecting end is pushed into a hole in the other arm 50 near its connecting end 56 (shown schematically in FIGS. 1, 7 and 8). To release, then, one simply pushes on the spring-pin assembly 88 and moves the two arms 50 out of contact with each other.

When the arms 50 are separated, the pin assemblies 54 may be released to move these assemblies longitudinally along the channels 46 and pivot the arms 50 to a longitudinal orientation under the corresponding support rails 40, at which point the release latches may be slide along the channels 46 to re-engage the respective arms 50 and hold the arms 50 in the stowed positions under the support rails. Thus, one will note that the deployment and stowage of the arms 50 can be accomplished without the need for tools.

Figure 14:
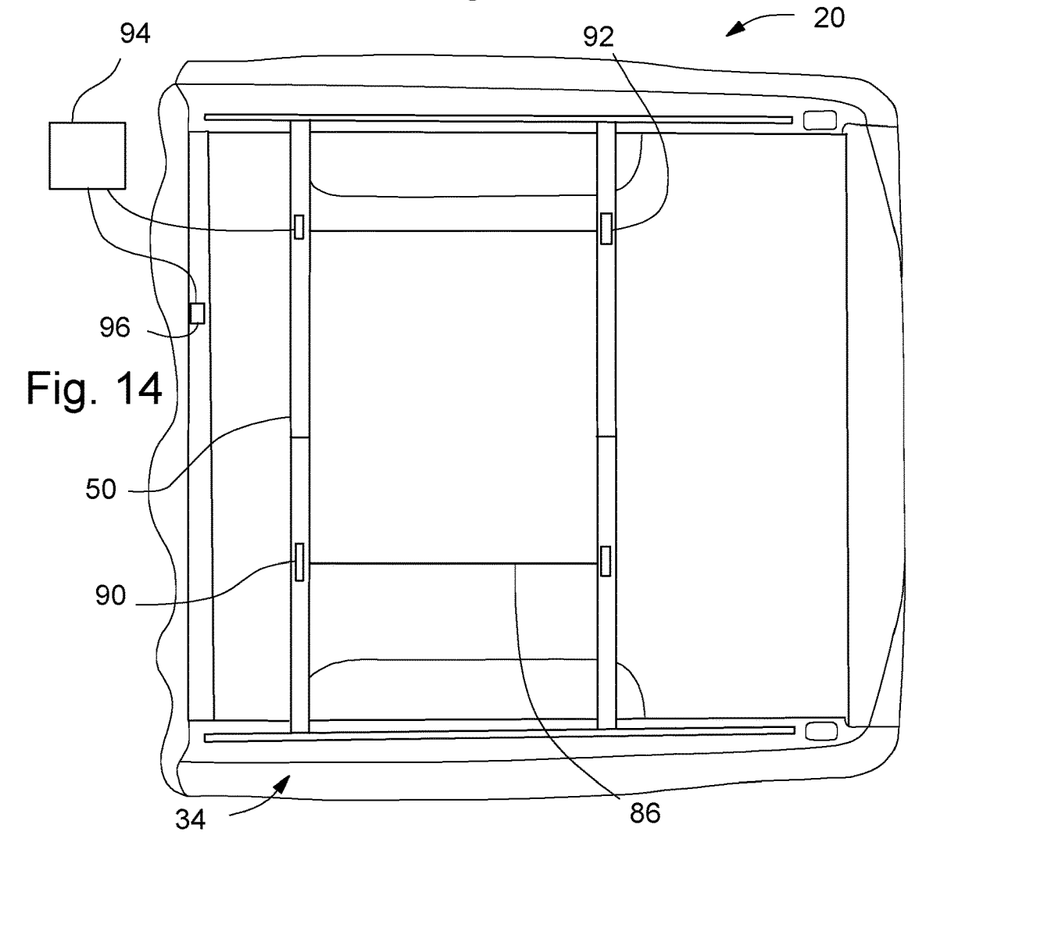
FIG. 14 is a view similar to FIG. 1, illustrating a cargo sensing system incorporated into the cargo support system.

FIG. 14 illustrates portions of a truck 20 and cargo support system 34 similar to that of FIG. 1, but with the addition of a cargo sensing system 90 that may be employed to monitor the stability of the cargo 86 during transport. Since many elements are the same as FIG. 1, the description of these elements will not be repeated.

A number of force sensors 92 (four shown schematically in FIG. 14, although more or fewer sensors may be employed, if so desired) are mounted to the arms 50, and a camera 96 may be mounted for viewing the bed 24. During transport of cargo 86, the sensors 92 send readings to a controller 94 (such as for example a body control module), which monitors the sensor output to detect lateral vibration of the cargo 86. Upon receiving input above a predetermined threshold, the controller 94 may then signal the vehicle operator or another as to this instability of the cargo 86 and activate the bed camera 96 for viewing by the vehicle operator. Such a signal to this person may be for example a warning on a vehicle instrument panel, a message sent to a portable device such as a cell phone, or by some other means. This allows the vehicle operator to take action to avoid further instability of the cargo 86 being supported by the cargo support system 34.

While certain embodiments of the present invention have been described in detail, those familiar with the art to which this invention relates will recognize various alternative designs and embodiments for practicing the invention as defined by the following claims.

The invention claimed is:

1. A cargo support system comprising:
 a truck bed having longitudinal extending sidewalls;
 longitudinally extending rails mounted above the sidewalls, each having a longitudinal slot on an underside connected to a longitudinal channel; and
 arms suspended from the underside of the rails above the sidewalls, each pivotable between a longitudinal orientation under the respective rail and a lateral orientation extending over the bed.

2. The system of claim 1 wherein each of the rails is attached to the respective sidewall at a vertically extending front end and a vertically extending rear end, with a longitudinal portion therebetween, the longitudinal portion including the channel.

3. The system of claim 1 wherein a pivot end of each arm includes a pin assembly that supports the arm from the corresponding rail while allowing for pivoting of the respective arm about a vertical axis.

4. The system of claim 3 wherein each of the pin assemblies is selectively longitudinally slidable in the respective channel.

5. The system of claim 4 wherein each of the pin assemblies includes a spring biased lock that selectively locks the pin assembly at location along the respective channel.

6. The system of claim 3 wherein a release end of each arm, at an opposed end from the pivot end, includes a release latch that supports the arm from the corresponding rail when the arm is oriented longitudinally under the corresponding rail.

7. The system of claim 6 wherein each of the release latches includes an end cap that is engageable with the respective release end to secure the arm in a longitudinal orientation and releasable from the respective release end to allow the arm to be pivoted from a longitudinal orientation to a lateral orientation.

8. The system of claim 1 wherein the arms include a right rear arm supported by a right rail and a left rear arm supported by a right rail, with the right and left rear arms configured to engage each other when pivoted to laterally oriented positions.

9. The system of claim 8 wherein the arms include a right forward arm supported by the right rail and a left forward arm supported by the right rail, with the right and left forward arms configured to engage each other when pivoted to laterally oriented positions.

10. The system of claim 1 further including a cargo sensing system having sensors mounted to the arms and configured to detect cargo stability for cargo secured by the arms.

11. A cargo support system comprising:
a truck bed having longitudinal extending sidewalls;
longitudinally extending rails mounted above the sidewalls, each having a longitudinal slot on an underside connected to a longitudinal channel; and
arms suspended from the underside of the rails above the sidewalls with pin assemblies, each arm pivotable about the respective pin assembly between a longitudinal orientation under the respective rail and a lateral orientation extending over the bed.

12. The system of claim 11 wherein each of the rails is attached to the respective sidewall at a vertically extending front end and a vertically extending rear end, with a longitudinal portion therebetween, the longitudinal portion including the channel.

13. The system of claim 12 wherein each of the pin assemblies is selectively longitudinally slidable in the respective channel.

14. The system of claim 12 wherein a release end of each arm, at an opposed end from the pivot end, includes a release latch that supports the arm from the corresponding rail when the arm is oriented longitudinally under the corresponding rail.

15. The system of claim 11 wherein each of the pin assemblies includes a spring biased lock that selectively locks the pin assembly at location along the respective channel.

16. The system of claim 11 wherein the arms include a right rear arm supported by a right rail and a left rear arm supported by a right rail, with the right and left rear arms configured to engage each other when pivoted to laterally oriented positions.

17. The system of claim 16 wherein the arms include a right forward arm supported by the right rail and a left forward arm supported by the right rail, with the right and left forward arms configured to engage each other when pivoted to laterally oriented positions.

18. The system of claim 11 further including a cargo sensing system having sensors mounted to the arms and configured to detect cargo stability for cargo secured by the arms.

19. The system of claim 18 further including a vehicle mounted camera mounted for viewing of the cargo by a vehicle operator, configured to activate when the sensors detect cargo instability.

\* \* \* \* \*